United States Patent [19]

Horner

[11] 4,251,043
[45] Feb. 17, 1981

[54] ADJUSTABLE SOLDERING IRON HOLDER

[76] Inventor: Ronny Horner, Farrington Apts., Apt. 215, 2120 Lombardi Dr., Clarksville, Ind. 41730

[21] Appl. No.: 25,396

[22] Filed: Mar. 30, 1979

[51] Int. Cl.³ ............................................. F16M 13/00
[52] U.S. Cl. .................................. 248/117.6; 248/124
[58] Field of Search ............... 248/117.1, 117.2, 117.3, 248/117.4, 117.5, 117.6, 117.7, 124

[56] References Cited

U.S. PATENT DOCUMENTS

| | | | |
|---|---|---|---|
| 44,447 | 9/1864 | O'Donnell | 248/124 X |
| 713,832 | 11/1902 | Bailey | 248/124 |
| 1,303,061 | 5/1919 | Herwig | 248/124 |
| 1,327,749 | 1/1920 | Whipp | 248/124 X |
| 1,375,888 | 4/1921 | Baer | 248/124 X |
| 1,697,966 | 1/1929 | Rubel | 248/117.1 X |
| 1,902,376 | 3/1933 | Purdin | 248/124 X |
| 2,172,682 | 9/1939 | Rauba | 248/117.4 |
| 2,598,529 | 5/1952 | Fritz | 248/124 X |
| 2,635,345 | 4/1953 | Samborski | 248/124 X |

Primary Examiner—William H. Schultz

[57] ABSTRACT

This device enables the user to hold a soldering iron steady, against that which is being soldered, and it is easily manipulated. It consists primarily of a base, in which is secured a post, upon which is an elevatable and rotatable arm with a sleeve, in which a soldering iron is removably received.

1 Claim, 2 Drawing Figures

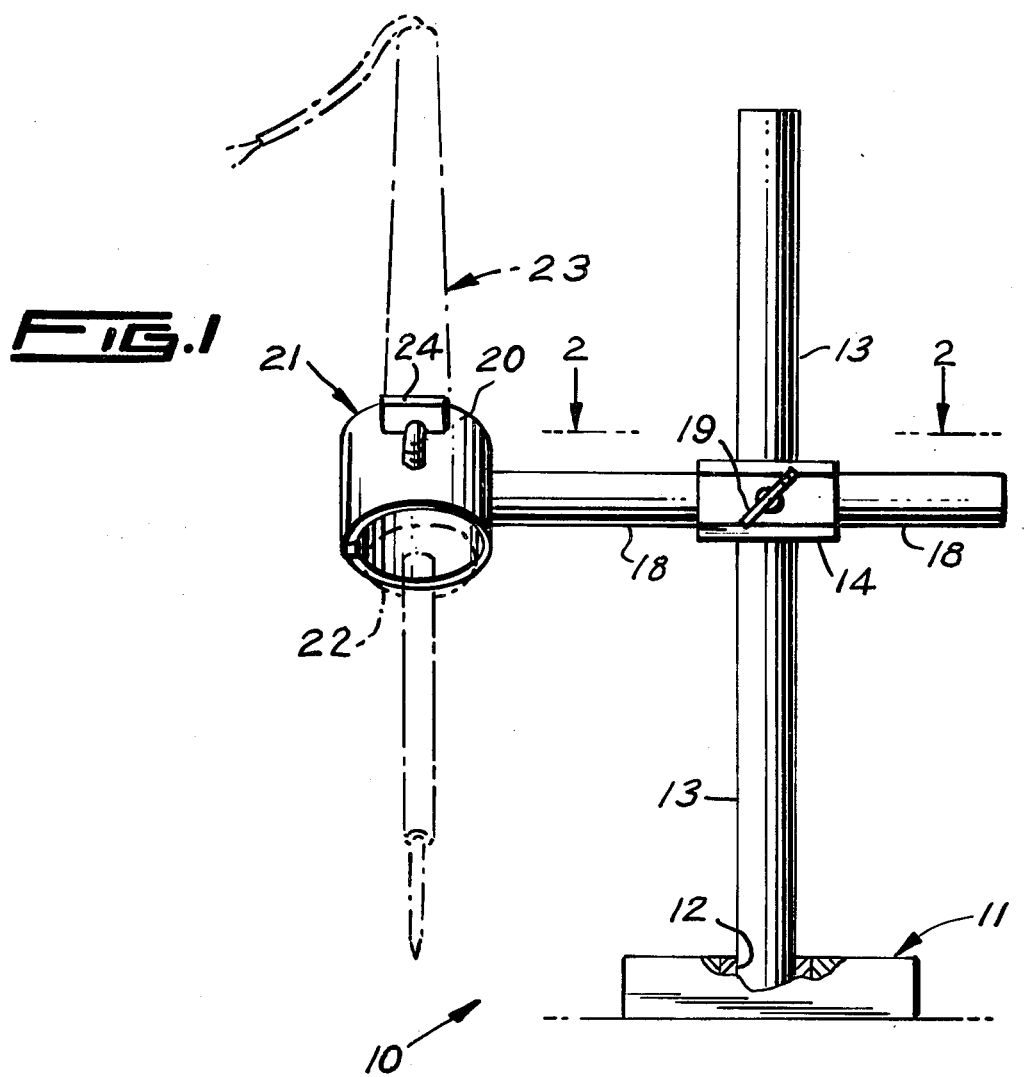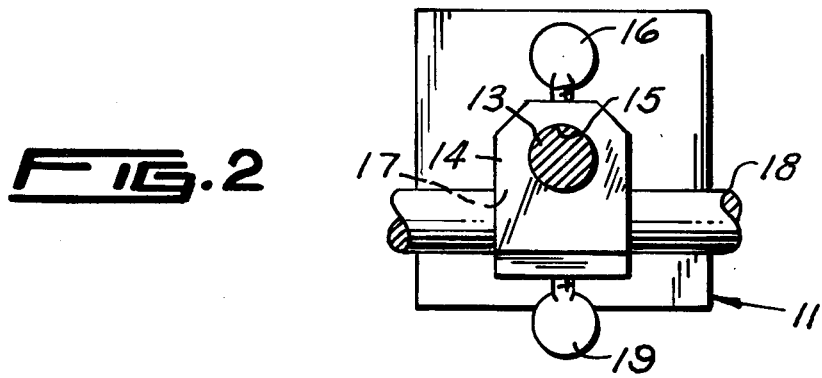

ADJUSTABLE SOLDERING IRON HOLDER

The invention relates to holders, and more particularly, to an adjustable soldering iron holder.

It is, therefore, the principal object of this invention to provide an adjustable soldering iron holder, which will firmly support and hold a soldering iron, while the user solders work.

Another object of this invention is to provide an adjustable soldering iron holder, which will be adjustable in height, and will removably receive a soldering iron.

A further object of this invention is to provide an adjustable soldering iron holder, which will be adjustable to any angle desired, so as to enable the user to quickly and effectively solder work.

Other objects of the invention are to provide an adjustable soldering iron holder, which will be simple in design, inexpensive to manufacture, easy to use, and efficient in use.

These, and other objects, will become readily evident, upon a study of the specification, and the accompanying drawing, in which:

FIG. 1 is a side view of the present invention, shown partly broken away, and illustrating a soldering iron in phantom lines, and FIG. 2 is a horizontal cross-sectional view, taken along the line 2-2 of FIG. 1.

According to this invention, a holder 10 is shown to include a rectangular base 11, having a central opening 12 vertically therethrough. A post 13 is secured within opening 12 at one end, and an adapter 14 includes an opening 15, in which post 13 is slidable. Adapter 14 is secured in any position upon post 13, by means of thumb screw 16. An opening 17 at right angles to opening 15, slidably receives arm 18, which is secured in any desired position by means of thumb screw 19.

An end of arm 18 is fixedly secured to the outer periphery 20 of a split-sleeve 21, which removably receives the lower handle portion 22 of soldering iron 23, and a thumb screw 24 in sleeve 21, provides a means of rendering soldering iron 23 secure therein. As will be readily seen in FIG. 1, arm 18 is rotatable in adapter 14 when desired, and the adapter 14 is also rotatable and can be raised on post 13.

While various changes may be made in the detail construction, it shall be understood that such changes will be within the spirit and scope of the present invention as is defined by the appended claims.

What I now claim is:

1. An adjustable soldering iron holder, comprising, in combination, a rectangular base, a post secured in said base supporting an adapter, an arm received in said adapter, and a split-sleeve secured to said arm, for removably receiving a handle portion of a soldering iron; said post being fixedly secured, at one end, in a vertical opening included in said base, said adapter having a first opening therethrough, which slidably and rotatably receives said post, and a first thumb screw selectively securing said adapter to said post; a second opening through said adapter being at right angles to said first opening, said second opening slidably and rotatably receiving said arm, and a second thumb screw selectively securing said arm to said adapter; one end of said arm fixedly secured to an outer periphery of said split-sleeve; and said split-sleeve removably receiving various sizes of said soldering iron handle portions, by being expandible, and a third thumb screw threaded transversely into said split-sleeve selectively securing said soldering iron handle portion to said split-sleeve.

* * * * *